United States Patent
Ku et al.

(10) Patent No.: US 9,806,938 B2
(45) Date of Patent: *Oct. 31, 2017

(54) METHOD AND APPARATUS FOR MITIGATING NETWORK FAILURES

(71) Applicant: AT&T INTELLECTUAL PROPERTY I, L.P., Atlanta, GA (US)

(72) Inventors: Bernard Ku, Austin, TX (US); Lakshminarashimhan Naidu, Pearland, TX (US); Armstrong Soo, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/398,922

(22) Filed: Jan. 5, 2017

(65) Prior Publication Data
US 2017/0118065 A1    Apr. 27, 2017

Related U.S. Application Data

(63) Continuation of application No. 15/202,740, filed on Jul. 6, 2016, now Pat. No. 9,559,895, which is a
(Continued)

(51) Int. Cl.
*H04L 12/24* (2006.01)
*H04W 8/26* (2009.01)
(Continued)

(52) U.S. Cl.
CPC ...... *H04L 41/0654* (2013.01); *H04L 65/1006* (2013.01); *H04W 8/26* (2013.01);
(Continued)

(58) Field of Classification Search
None
See application file for complete search history.

(56) References Cited

U.S. PATENT DOCUMENTS

| 5,497,504 A | 3/1996 | Acampora et al. |
| 6,385,451 B1 | 5/2002 | Kalliokulju et al. |

(Continued)

FOREIGN PATENT DOCUMENTS

| AU | 2002301943 A1 | 2/2005 |
| AU | 2004315426 B2 | 1/2008 |

(Continued)

OTHER PUBLICATIONS

Gibson, Jerry D. , "The 3-dB transcoding penalty in digital cellular communications", Information Theory and Applications Workshop (ITA), IEEE, 2011.

(Continued)

*Primary Examiner* — Vinncelas Louis
(74) *Attorney, Agent, or Firm* — Guntin & Gust, PLC; Joseph Hrutka

(57) ABSTRACT

A network may include a method that includes, for example, receiving a communication request responsive to a telephone number mapping query failure, where the communication request is initiated by an originating communication device requesting a communication session with a terminating communication device, foregoing initiating the communication session as a circuit-switched communication session responsive to determining that the originating communication device and the terminating communication device are enabled to use packet-switched communications, and instructing a second network node to initiate the communication session as a packet-switched communication session between the originating communication device and the terminating communication device responsive to the determination. Other embodiments are disclosed.

20 Claims, 6 Drawing Sheets

Related U.S. Application Data continuation of application No. 14/050,010, filed on Oct. 9, 2013, now Pat. No. 9,408,241.

(51) Int. Cl.
*H04L 29/06* (2006.01)
*H04W 76/02* (2009.01)
*H04L 29/12* (2006.01)
*H04W 88/18* (2009.01)

(52) U.S. Cl.
CPC ......... *H04W 76/022* (2013.01); *H04L 61/157* (2013.01); *H04L 65/602* (2013.01); *H04W 88/181* (2013.01)

(56) References Cited

U.S. PATENT DOCUMENTS

| | | |
|---|---|---|
| 6,400,954 B1 | 6/2002 | Khan et al. |
| 6,496,492 B1 | 12/2002 | Zeng |
| 6,539,221 B1 | 3/2003 | Vasudevan et al. |
| 6,560,460 B1 | 5/2003 | Horneman et al. |
| 6,993,332 B2 | 1/2006 | Pedersen et al. |
| 7,684,366 B2 | 3/2010 | Cheng et al. |
| 8,433,329 B2 | 4/2013 | Grote-Hahn et al. |
| 8,504,040 B2 | 8/2013 | Lee et al. |
| 2009/0093250 A1* | 4/2009 | Jackson .................... H04L 1/22 455/435.1 |
| 2009/0163223 A1 | 6/2009 | Casey |
| 2010/0004014 A1 | 1/2010 | Coulombe |
| 2010/0149995 A1 | 6/2010 | Khan et al. |
| 2011/0188477 A1 | 8/2011 | Zaki |
| 2013/0102351 A1 | 4/2013 | Mo et al. |
| 2014/0019125 A1 | 1/2014 | Laaksonen et al. |
| 2015/0092575 A1* | 4/2015 | Khay-Ibbat ........... H04L 65/602 370/252 |
| 2016/0315799 A1 | 10/2016 | Ku et al. |

FOREIGN PATENT DOCUMENTS

| | | |
|---|---|---|
| WO | 9858515 | 12/1998 |
| WO | 2006062306 A1 | 6/2006 |
| WO | 2013079556 A1 | 6/2013 |
| WO | 2013108121 A2 | 7/2013 |

OTHER PUBLICATIONS

Standard, , "Telecommunications and Internet Converged Services and Protocols for Advanced Networking (TISPAN)", PSTN/ISDN Emulation Sub-system (PES); Functional Architecture, 2006.

* cited by examiner

100

ENUM Failure With Mitigation

400

500

METHOD AND APPARATUS FOR MITIGATING NETWORK FAILURES

CROSS-REFERENCE TO RELATED APPLICATIONS

This application is a continuation of and claims priority to U.S. patent application Ser. No. 15/202,740, filed Jul. 6, 2016, which is a continuation and claims priority to U.S. Patent application Ser. No. 14/050,010, filed Oct. 9, 2013, now U.S. Pat. No. 9,408,241. The contents of the foregoing are hereby incorporated by reference into this application as if set forth herein in full.

FIELD OF THE DISCLOSURE

The subject disclosure relates to a method and apparatus for mitigating network failures.

BACKGROUND

Service providers continue to migrate their networks from circuit-switched voice communication networks to packet-switched voice communication networks. Similarly, it is expected that service providers of wireless communication systems will migrate their networks to support voice over long term evolution (VoLTE) communications from current circuit-switched technologies such as is presently used in second generation (2G) and third generation (3G) wireless voice communication networks.

BRIEF DESCRIPTION OF THE DRAWINGS

Reference will now be made to the accompanying drawings, which are not necessarily drawn to scale, and wherein.

DETAILED DESCRIPTION

Figure 1:
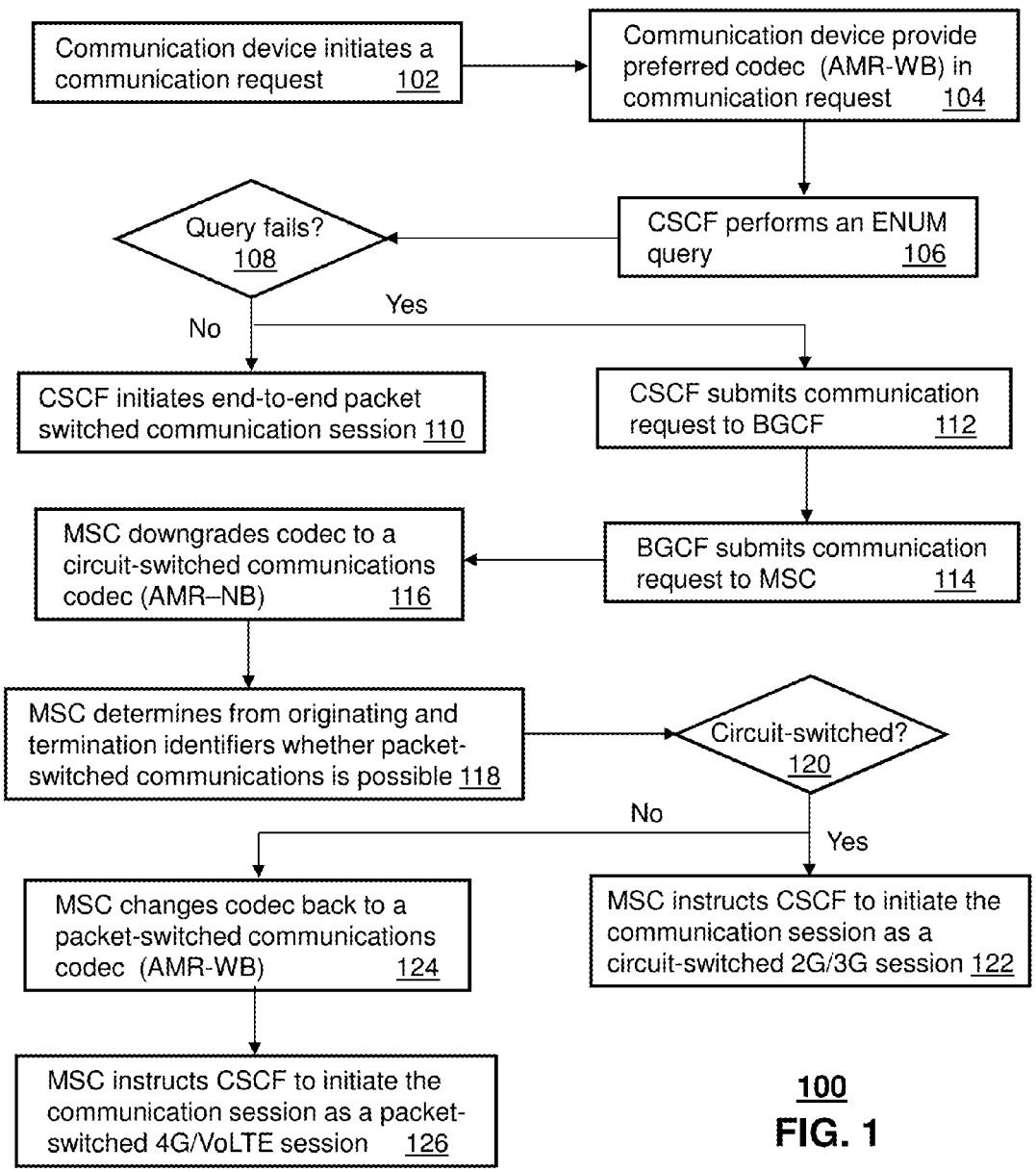
FIG. 1 depicts an illustrative embodiment of a method for processing communication requests.

The subject disclosure describes, among other things, illustrative embodiments for mitigating failures relating to telephone number mapping (ENUM) queries. Other embodiments are included in the subject disclosure.

One embodiment of the subject disclosure includes a method for receiving, by a multiple systems coupling server comprising a processor, a communication request from a network node responsive to a telephone number mapping query failure, where the communication request is initiated by an originating communication device requesting a communication session, and where the communication request comprises a terminating party identifier of a terminating party communication device and an originating party identifier of the originating communication device, determining, by the multiple systems coupling server, that the originating communication device and the terminating communication device are enabled to use packet-switched communications according to the originating party identifier of the originating communication device and the terminating party identifier of the terminating party communication device, and instructing, by the multiple systems coupling server, a call session control function device to initiate the communication session as a packet-switched communication session between the originating communication device and the terminating communication device responsive the determination.

One embodiment of the subject disclosure includes a machine-readable storage medium including executable instructions, which when executed by a controller, cause the controller to perform operations including receiving, by a first network node that coordinates circuit-switched communication sessions, a communication request responsive to a telephone number mapping query failure, where the communication request is initiated by an originating communication device requesting a communication session with a terminating communication device, determining, by the first network node, that the originating communication device and the terminating communication device are enabled to use packet-switched communications, foregoing, by the first network node, initiating the communication session as a circuit-switched communication session responsive to the determination, and instructing, by the first network node, a second network node to initiate the communication session as a packet-switched communication session between the originating communication device and the terminating communication device responsive to the determination.

One embodiment of the subject disclosure includes a first network node including a memory to store executable instructions, and a controller coupled to the memory. Responsive to executing the instructions the controller can perform operations including receiving a communication request responsive to a telephone number mapping query failure, where the communication request is initiated by an originating communication device requesting a communication session with a terminating communication device, foregoing initiating the communication session as a circuit-switched communication session responsive to determining that the originating communication device and the terminating communication device are enabled to use packet-switched communications, and instructing a second network node to initiate the communication session as a packet-switched communication session between the originating communication device and the terminating communication device responsive to the determination.

FIG. 1 depicts an illustrative embodiment of a method 100 for processing communication requests. In one embodiment, method 100 can begin with step 102 in which a communication device capable of packet-switched communications such as 4G/Voice over LTE or 4G/VoLTE, or other related packet-switched communication technologies, initiates a communication request. In step 104, the communication device includes in the communication request, which can be formatted as a session initiation protocol (SIP) message, a preferred codec described according to a session descriptor protocol (SDP) section of the SIP message. The codec for a 4G/VoLTE communication device can be an adaptive multi-rate wideband speech (AMR-WB) codec, which in the present illustration would serve as the preferred codec. As a fallback (or backup) option, the communication device identifies in the SDP section of the SIP message an adaptive multi-rate narrowband speech (AMR-NB) codec.

Figure 4:
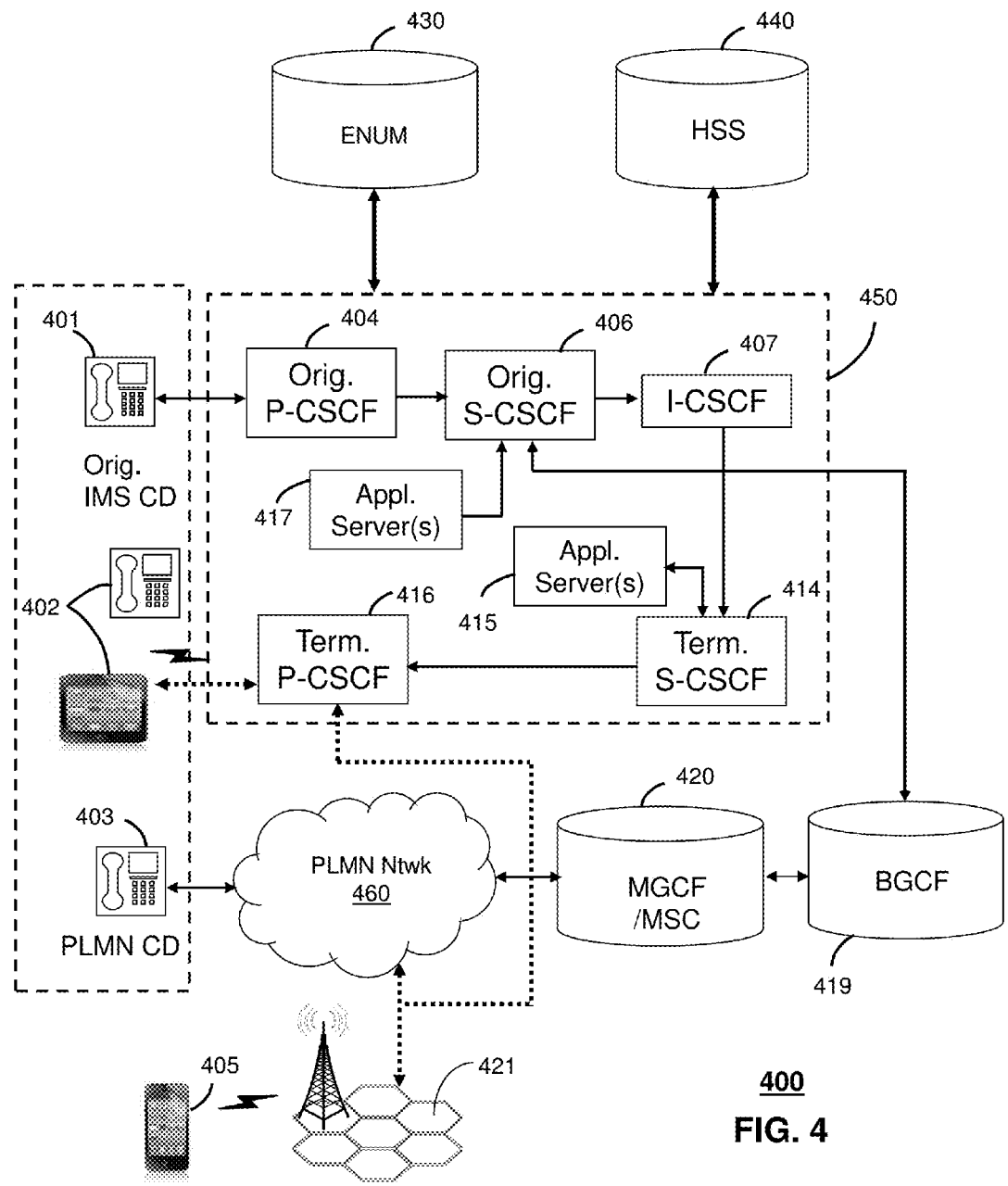
FIG. 4 depicts illustrative embodiment of a communication system that operates according to the method of FIG. 1.

The communication request is routed in an IP multimedia subsystem network as shown in FIG. 4 to a serving call session control function (S-CSCF) by way of a Session Border Controller (SBC) and Proxy-CSCF (P-CSCF), respectively. The S-CSCF in turn submits at step 106 an ENUM query to an ENUM server. The ENUM query includes an originating identifier of the requesting (or originating) communication device and a terminating identifier of a targeted (or termination) communication device. The originating and terminating identifiers can be E.164 telephone numbers, which the ENUM server uses to generate a Uniform Resource Identifier (URI) that can be used by the S-CSCF to initiate an end-to-end communication session between the originating and terminating communication devices.

When the ENUM server responds with a URI at step 108 under normal operating conditions, and when the terminating communication device is also recognized by the ENUM server as a 4G/VoLTE-capable device, the S-CSCF utilizes the URI provided by the ENUM server to initiate an end-to-end 4G/VoLTE packet-switched communication session at step 110. When, however, the ENUM server fails to responds due to a malfunction or network fault, the S-CSCF proceeds to step 112 where it defaults to submitting the communication request to a Breakout Gateway Control Function (BGCF), which in turn submits the communication request at step 114 to an Media Gateway Control Function/Multiple Systems Coupling (MGCF/MSC) server(s) as shown in FIG. 4 (herein referred to singly or collectively as MSC).

At this stage, the communication request is formatted as a SIP message with an AMR-WB preferred codec in the SDP section of the SIP message. Upon detecting an AMR-WB codec, the MSC downgrades the code at step 116 to a circuit-switched 2G/3G narrowband codec (AMR-NB). At step 118, the MSC determines from the originating and terminating identifiers of the originating and terminating communication devices, respectively, whether both communication devices are capable of packet-switched communications (e.g., 4G/VoLTE). This step can be accomplished by searching a database using the originating and terminating identifiers provided to the MSC in the communication request to identify the capabilities of each of the originating and terminating communication devices.

If at step 120 the MSC determines that one or both of the originating and terminating communication devices is not capable of packet-switched communications, then the MSC proceeds to step 122 and instructs an interrogating call session control function (I-CSCF) to initiate a circuit-switched 2G/3G communication session. If, on the other hand, the MSC determines at step 120 that both of the originating and terminating communication devices are capable of packet-switched communications, then the MSC proceeds to step 124 where it changes the codec in the SDP back to AMR-WB as the preferred codec to enable 4G/VoLTE packet-switched communications. Once the codec is modified, the MSC proceeds to step 126 where it instructs the I-CSCF to initiate the communication session as a packet-switched 4G/VoLTE communication session.

Figure 2:
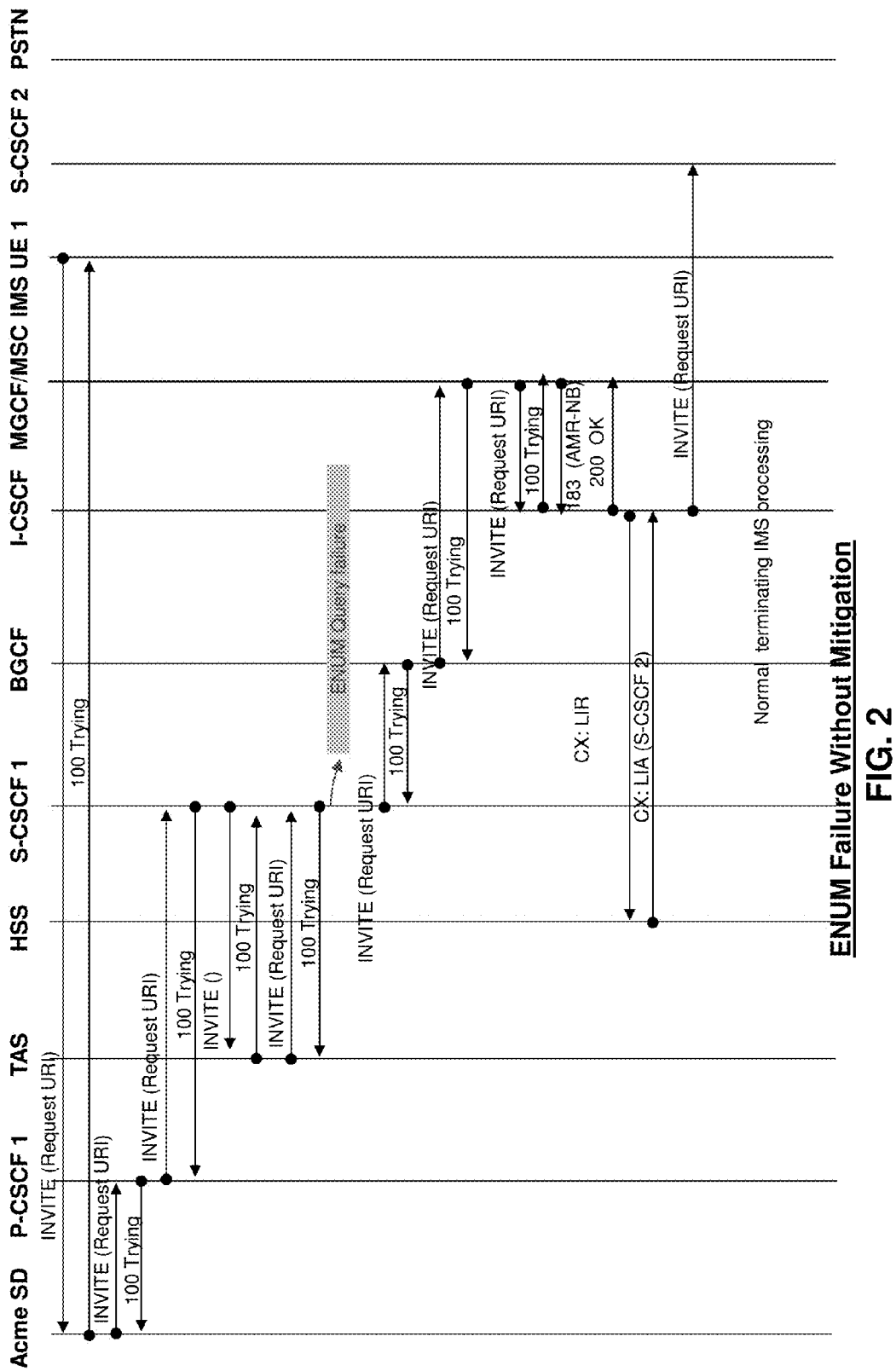
FIG. 2 depicts an illustrative embodiment of a flow diagram for initiating a communication session without the mitigation technique described by the method depicted in FIG. 1.
Figure 3:
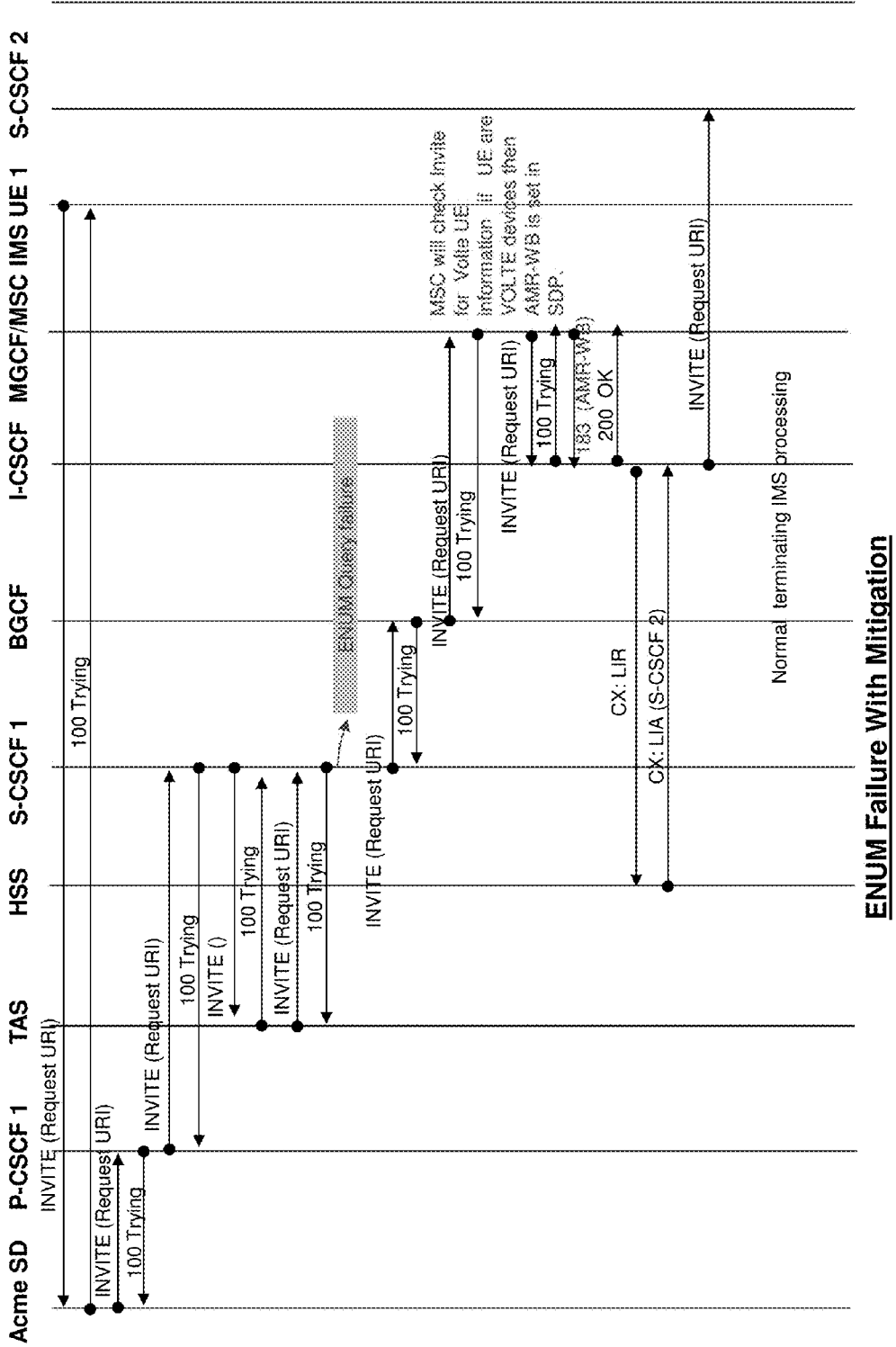
FIG. 3 depicts an illustrative embodiment of a flow diagram for initiating a communication session according to the mitigation technique described by the method depicted in FIG. 1.

Steps 120-126 are demonstrated by the flow diagram of FIG. 3, which illustrates a novel way to mitigate an ENUM failure according to method 100. FIG. 2 illustrates a flow diagram without the use of method 100. In the flow diagram of FIG. 2, if an ENUM query failure occurs, the MSC will downgrade a codec to AMR-NB as described earlier at step 116, and direct the I-CSCF to initiate the communication session as a circuit-switched communication session independent of whether both the originating and terminating communication devices are capable of 4G/VoLTE communications.

Steps 118, 120, 124 and 126 of method 100 enable VoLTE communication devices to maintain a higher quality voice communication session with AMR-WB packet-switched services even when an ENUM query fails. In prior art systems, an ENUM failure would have resulted in the MSC initiating an AMR-NB circuit-switched communication session without the techniques described in method 100.

FIG. 4 depicts an illustrative embodiment of a communication system 400 employing an IMS network architecture to facilitate the combined services of circuit-switched and packet-switched systems. The ENUM server, CSCF servers, HSS and other network nodes of the IMS network 450 described below can be configured to operate as described above in relation to method 100 of FIG. 1.

Communication system 400 can comprise a Home Subscriber Server (HSS) 440, an ENUM server 430, and other network elements of an IMS network 450. The IMS network 450 can establish communications between IMS-compliant communication devices (CDs) 401, 402, PLMN CDs 403, 405, and combinations thereof by way of a Media Gateway Control Function (MGCF) 420 coupled to a PLMN network 460. The MGCF 420 need not be used when a communication session involves IMS CD to IMS CD communications. A communication session involving at least one PLMN CD may utilize the MGCF 420.

IMS CDs 401, 402 can register with the IMS network 450 by contacting a Proxy CSCF (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 400 of FIG. 4.

If the terminating communication device is instead a PLMN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PLMN CD over the PLMN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
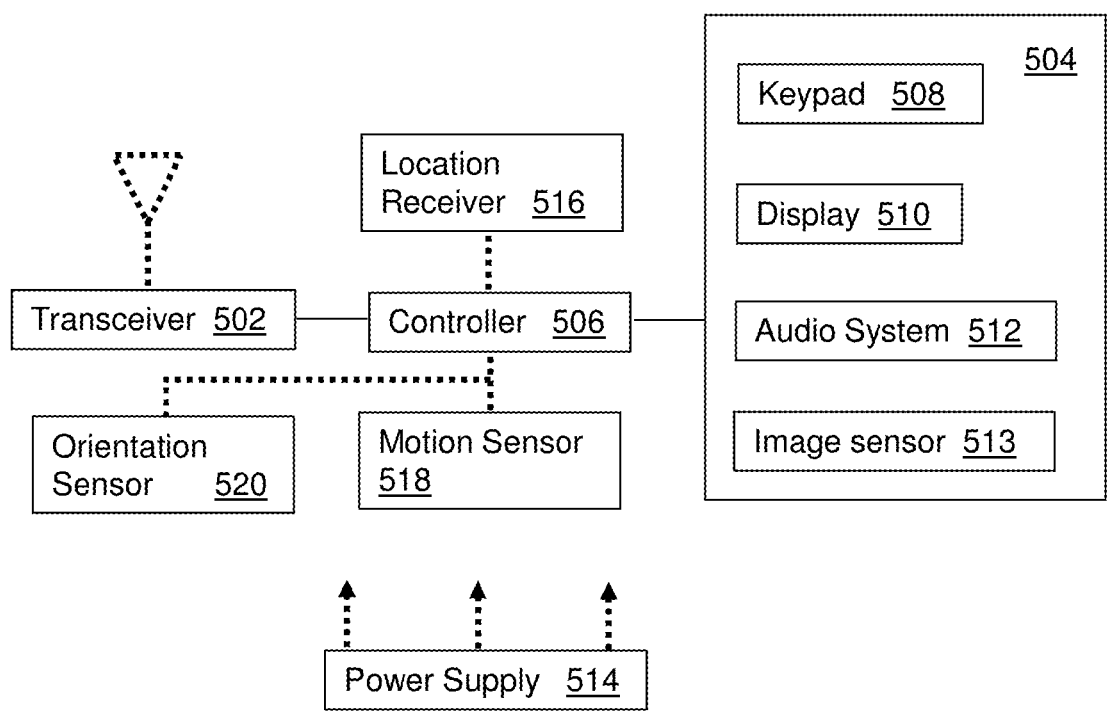
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIG. 4. The communication device 500 described below can embodiment any device described above, and when applicable can be configured in whole or in part to operate as described above in relation to method 100 of FIG. 1.

With this in mind, communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PLMN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
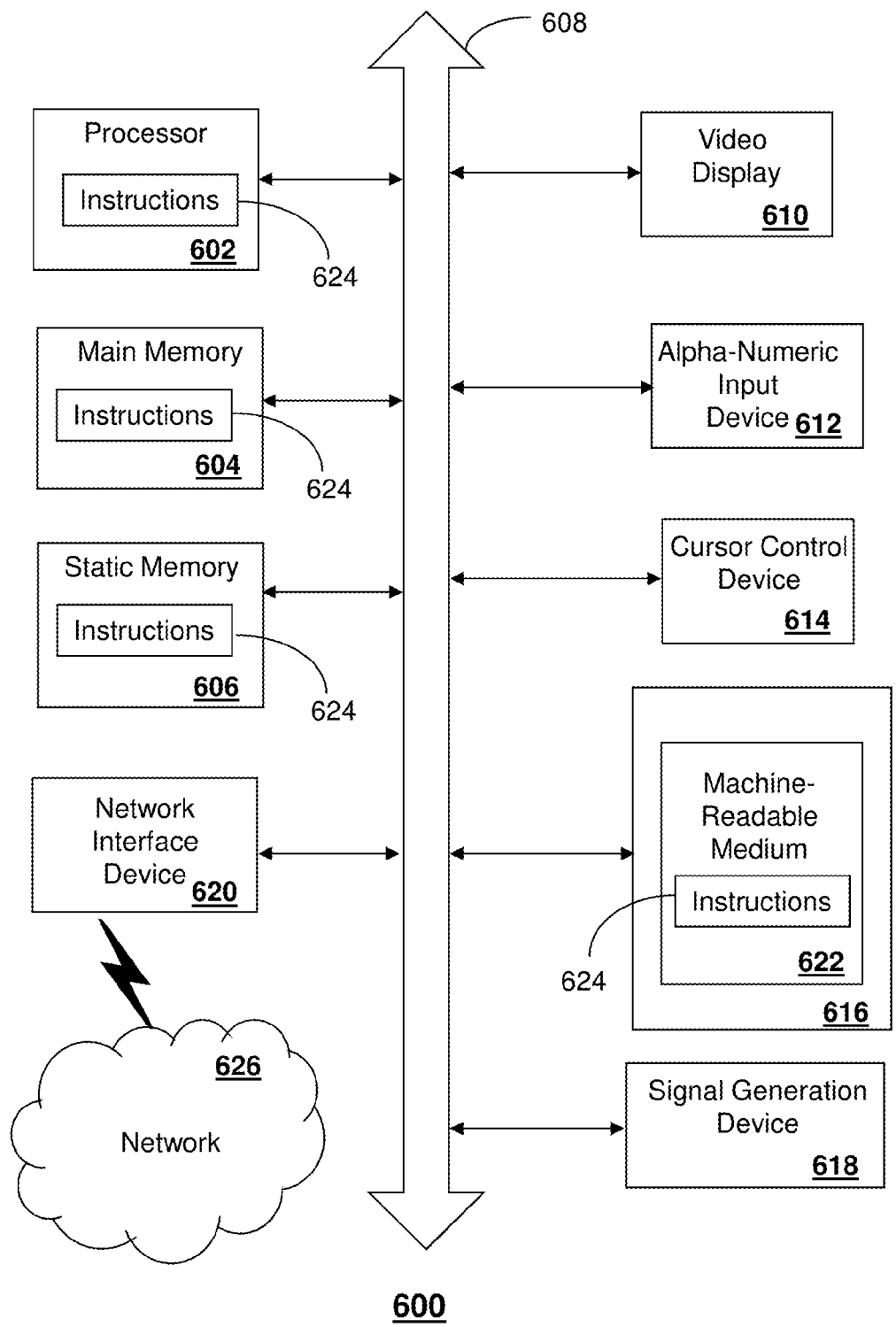
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. In some embodiments, the machine may be connected (e.g., using a network 626) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display. The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   downgrading, by a multiple systems coupling server comprising a processor, a first codec to a second codec for circuit switched communications, responsive to a breakout gateway control function system receiving a notification of a failure notice of a telephone number mapping query for a communication request, wherein the communication request includes the first codec, a terminating party identifier of a terminating party communication device, and an originating party identifier of an originating communication device;
   determining, by the multiple systems coupling server, that packet-switched voice over long-term evolution communications is possible according to the originating party identifier of the originating communication device and the terminating party identifier of the terminating party communication device;

upgrading, by the multiple systems coupling server, the second codec back to the first codec responsive to the determination that the packet-switched voice over long-term evolution communications is possible; and instructing, by the multiple systems coupling server, a call session control function device to initiate a communication session as a packet-switched communication voice over long-term evolution session between the originating communication device and the terminating party communication device responsive to the determination that the packet-switched voice over long-term evolution communications is possible.

2. The method of claim 1, wherein the second codec comprises an adaptive multi-rate narrowband speech codec.

3. The method of claim 1, wherein the first codec comprises an adaptive multi-rate wideband speech codec.

4. The method of claim 1, wherein the first codec is included in a session descriptor protocol of a session initiation protocol invite message.

5. The method of claim 1, wherein the call session control function device receives the communication request and forwards the communication request to a telephone number mapping server to perform the telephone number mapping query.

6. The method of claim 1, wherein the failure of the telephone number mapping query is caused from a serving call session control function device submitting the telephone number mapping query to a telephone number mapping server in order to process the communication request initiated by the originating communication device.

7. The method of claim 6, wherein the failure of the telephone number mapping query causes the serving call session control function device to communicate with the breakout gateway control function system.

8. The method of claim 1, wherein the multiple systems coupling server operates in an internet protocol multimedia subsystem network.

9. A non-transitory machine-readable storage medium, comprising executable instructions, which when executed by a processing system including a processor, facilitate performance of operations, comprising:

downgrading a first codec to a second codec for circuit switched communications responsive to a breakout gateway control function system receiving a notification of a failure notice of a telephone number mapping query for a communication request that includes the first codec;

determining that packet-switched voice over long-term evolution communications is possible according to an originating party identifier of an originating communication device and a terminating party identifier of a terminating party communication device;

upgrading the second codec back to the first codec responsive to the determination that the packet-switched voice over long-term evolution communications is possible; and initiating a communication session as a packet-switched communication voice over long-term evolution session between the originating communication device and the terminating party communication device responsive to the determination that the packet-switched voice over long-term evolution communications is possible.

10. The non-transitory machine-readable storage medium of claim 9, wherein the operations further comprise foregoing initiating the communication session as a circuit-switched communication session responsive to the determination that packet-switched voice over long-term evolution communications is not possible.

11. The non-transitory machine-readable storage medium of claim 9, wherein the operations further comprise instructing a call session control function device to initiate the communication session responsive the determination that the packet-switched voice over long-term evolution communications is possible.

12. The non-transitory machine-readable storage medium of claim 9, wherein the second codec comprises an adaptive multi-rate narrowband speech codec, and wherein the first codec comprises an adaptive multi-rate wideband speech codec.

13. The non-transitory machine-readable storage medium of claim 9, wherein the first codec is included in a session descriptor protocol of a session initiation protocol invite message of the communication request.

14. A first network node, comprising:
a processing system including a processor; and
a memory that stores executable instructions that, when executed by the processing system, facilitate performance of operations, comprising:

downgrading a first codec to a second codec for circuit switched communications responsive to a breakout gateway control function system receiving a notification of a failure notice of a telephone number mapping query for a communication request, wherein the communication request includes the first codec, a terminating party identifier of a terminating party communication device, and an originating party identifier of an originating communication device;

determining that packet-switched voice over long-term evolution communications is possible according to the originating party identifier of the originating communication device and the terminating party identifier of the terminating party communication device;

upgrading the second codec back to the first codec responsive to the determination that the packet-switched voice over long-term evolution communications is possible; and initiating, by a second network node, a communication session as a packet-switched communication voice over long-term evolution session between the originating communication device and the terminating party communication device responsive to the determination that the packet-switched voice over long-term evolution communications is possible.

15. The network node of claim 14, wherein the first network node comprises a multiple systems coupling server.

16. The network node of claim 14, wherein the second network node comprises a call session control function device.

17. The network node of claim 14, wherein the operations further comprise foregoing initiating the communication session as a circuit-switched communication session responsive to determining is the packet-switched voice over long-term evolution communications is not possible.

18. The network node of claim 14, wherein the first codec is included in a session descriptor protocol of a session initiation protocol invite message.

19. The network node of claim 14, wherein the second codec comprises an adaptive multi-rate narrowband speech codec.

20. The network node of claim 19, wherein the first codec comprises an adaptive multi-rate wideband speech codec.

\* \* \* \* \*